(12) United States Patent
Chung et al.

(10) Patent No.: US 10,222,873 B2
(45) Date of Patent: Mar. 5, 2019

(54) AUXILIARY DEVICE AND NAVIGATION SYSTEM USING THE SAME

(71) Applicant: PIXART IMAGING INC., Hsin-Chu (TW)

(72) Inventors: Ching-Lin Chung, Hsin-Chu (TW); Chia-Fu Ke, Hsin-Chu (TW); Jr-Shen Yang, Hsin-Chu (TW); Yen-Min Chang, Hsin-Chu (TW)

(73) Assignee: PIXART IMAGING INC., Hsin-Chu (TW)

(*) Notice: Subject to any disclaimer, the term of this patent is extended or adjusted under 35 U.S.C. 154(b) by 18 days.

(21) Appl. No.: 15/333,320

(22) Filed: Oct. 25, 2016

(65) Prior Publication Data

US 2017/0300130 A1    Oct. 19, 2017

(30) Foreign Application Priority Data

Apr. 15, 2016   (TW) .............................. 105111837 A

(51) Int. Cl.
| | | |
|---|---|---|
| *G06F 3/03* | (2006.01) | |
| *G06F 3/0354* | (2013.01) | |
| *G06F 3/038* | (2013.01) | |
| *G06F 3/0338* | (2013.01) | |

(52) U.S. Cl.
CPC .......... *G06F 3/0304* (2013.01); *G06F 3/0317* (2013.01); *G06F 3/0338* (2013.01); *G06F 3/0383* (2013.01); *G06F 3/03542* (2013.01); *G06F 3/03543* (2013.01); *G06F 3/03545* (2013.01); *G06F 3/0386* (2013.01); *G06F 2203/0384* (2013.01)

(58) Field of Classification Search
CPC .. G06F 3/0304; G06F 3/0383; G06F 3/03543; G06F 3/03542; G06F 3/03545; G06F 3/0386; G06F 2203/0384
See application file for complete search history.

(56) References Cited

U.S. PATENT DOCUMENTS

| | | | |
|---|---|---|---|
| 2004/0041798 A1* | 3/2004 | Kim ...................... | G06F 1/1626 345/179 |
| 2004/0155862 A1* | 8/2004 | Higginson ............... | G05G 1/06 345/156 |
| 2013/0229387 A1* | 9/2013 | Chen ...................... | G06F 3/042 345/175 |

* cited by examiner

*Primary Examiner* — Shaheda Abdin
(74) *Attorney, Agent, or Firm* — Li & Cai Intellectual Property (USA) Office

(57) ABSTRACT

Provided herein are an auxiliary device and a navigation system using the auxiliary device. The auxiliary device is configured to integrate with a pen mouse. When the pen mouse is tightly combined with the auxiliary device, the auxiliary device determines to use a first cursor displacement information data provided by the pen mouse and/or a second cursor displacement information data provided by the auxiliary device as a control signal for controlling a cursor corresponding to an electronic device according to an operation mode selected by the user.

16 Claims, 6 Drawing Sheets

AUXILIARY DEVICE AND NAVIGATION SYSTEM USING THE SAME

BACKGROUND

1. Technical Field

The present invention generally relates to an auxiliary device and a navigation system using the same and, more particularly, to an auxiliary device configured to integrate with a pen mouse and a navigation system using the auxiliary device.

2. Description of Related Art

A pen mouse is a navigation device with a pen-shaped appearance. The operation principle of a pen mouse is similar to that of a general optical mouse. In other words, an optical sensor is used to sense the displacement of a pen mouse on a working plane so as to control the cursor motion of an electronic device to achieve navigation. However, even though the currently available pen mouse provides a better writing feeling, the operation may not meet the requirement of navigation for a conventional mouse, which makes the user uneasy when switching between operations of a pen mouse and a conventional mouse. Therefore, in view of the above, the present invention aims at providing a navigation system that is more convenient for the user.

SUMMARY

One aspect of the present invention provides an auxiliary device. The auxiliary device is configured to integrate with a pen mouse and includes a body and a processor. The body includes a fixing portion that enables the user to selectively combine the pen mouse tightly with the auxiliary device. The auxiliary device is configured to receive a first cursor displacement information data provided by the pen mouse through an electrical connector interface disposed on the fixing portion when the pen mouse is tightly combined with the auxiliary device. The processor is coupled to the electrical connector interface and is configured to determine whether to use the first cursor displacement information data provided by the pen mouse and/or a second cursor displacement information data provided by the auxiliary device as a control signal for controlling a cursor corresponding to an electronic device according to an operation mode selected by the user.

Another aspect of the present invention provides a navigation system. The navigation system includes a pen mouse configured to provide a first cursor displacement information data and an auxiliary device configured to provide a second cursor displacement information data. The auxiliary device includes a body and a processor. The body includes a fixing portion that enables the user to selectively combine the pen mouse tightly with the auxiliary device. The auxiliary device is configured to receive the first cursor displacement information data provided by the pen mouse through an electrical connector interface disposed on the fixing portion when the pen mouse is tightly combined with the auxiliary device. The processor is coupled to the electrical connector interface and is configured to determine whether to use the first cursor displacement information data provided by the pen mouse and/or a second cursor displacement information data provided by the auxiliary device as a control signal for controlling a cursor corresponding to an electronic device according to an operation mode selected by the user.

As previously stated, the present invention provides an auxiliary device and a navigation system using the same, capable of providing more precise cursor control information and bringing forth more convenient and diverse operating experiences.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

Figure 1:
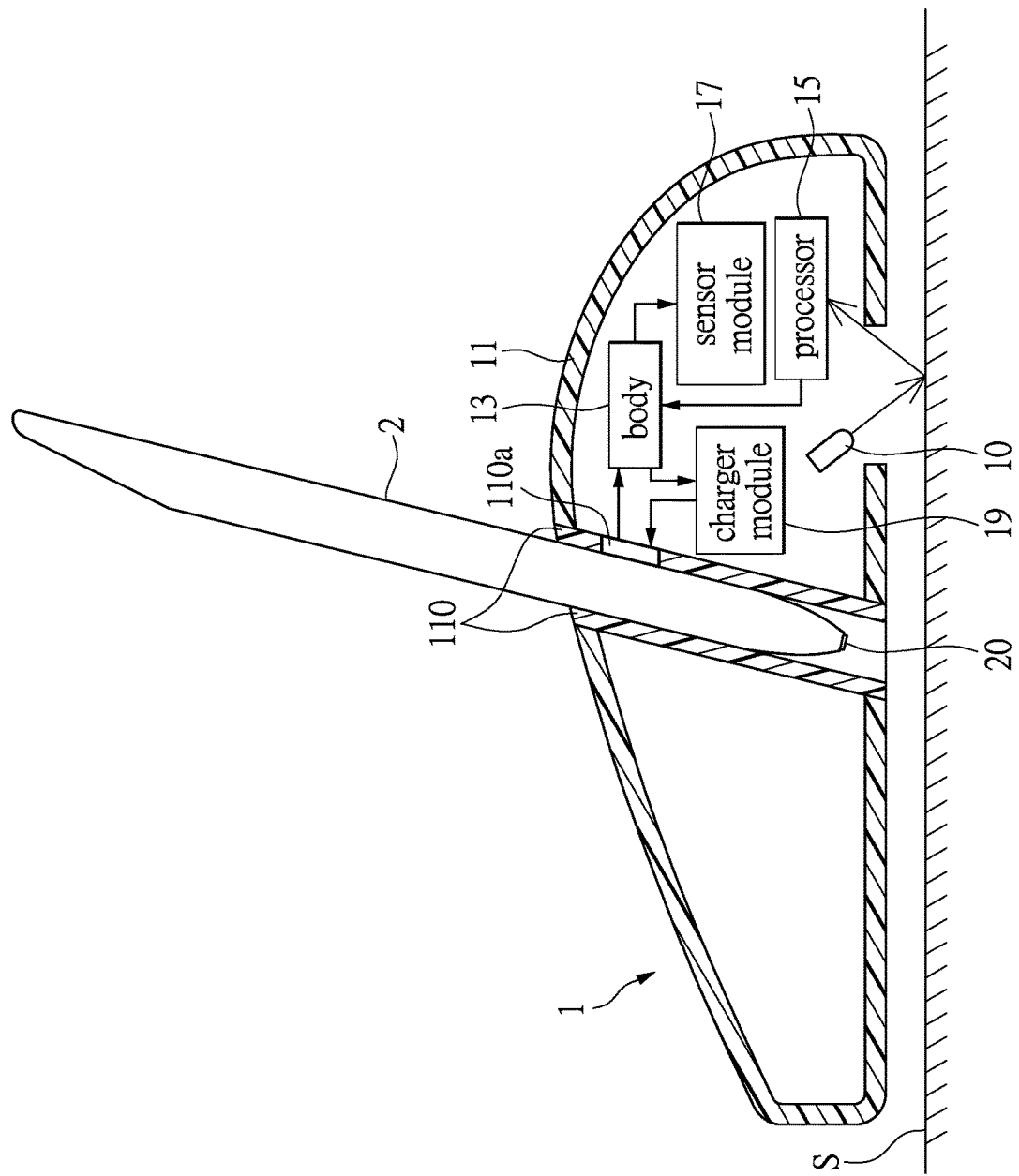
FIG. 1 is a functional block diagram of an auxiliary device according to one embodiment of the present invention.

Referring to FIG. 1, FIG. 1 is a functional block diagram of an auxiliary device according to one embodiment of the present invention. The auxiliary device 1 includes a body 11 and a processor 13. The body 11 is, for example, a hollow shell. The processor 13 is properly fixed to the inside of the body 11. Therefore, practically, the body 11 may be implemented by a one-piece structure, or a combination of multiple pieces. However, the present invention is not limited to the implementation of the body 11. Moreover, the processor 13 can be implemented by hardware circuitry, or by hardware circuitry with firmware or with software implemented by hardware circuitry, or by hardware circuitry with firmware or with software. However, the present invention is not limited to the implementation of the processor 13.

In FIG. 1, the body 11 further includes a fixing portion 110 that enables the user to selectively combine the pen mouse 2 tightly with the auxiliary device 1. It should be noted that, in the present embodiment, the auxiliary device 1 is configured to integrate with a pen mouse. Therefore, practically, the present invention is not limited to the implementation of the pen mouse 2. Persons with ordinary skill in the art may make any modifications on the pen mouse 2 according to practical demands or applications. For example, the pen mouse 2 is, for example, an optical pen mouse including at least one light source 20, to which the present invention is not limited.

Accordingly, the light source 20 of the pen mouse 2 is prevented from being blocked by the body 11 so that the light source 20 can emit light onto a working plane S to provide a first cursor displacement information data according to a displacement of the light source 20 on the working plane S to achieve the conventional navigation applications. Therefore, the fixing portion 110 is designed with through holes, as shown in FIG. 1. However, it should be noted that the implementation of the fixing portion 110 only exemplifies the present embodiment and is not intended to limit the present invention. In other words, persons with ordinary skill in the art may make any modifications on the fixing portion 110 according to practical demands or applications as long as the fixing portion 110 does not hinder the pen mouse 2 from achieving the conventional navigation applications.

On the other hand, when the pen mouse 2 is tightly combined with auxiliary device 1, the auxiliary device 1 receives the first cursor displacement information data provided by the pen mouse 2 through an electrical connector interface 110a disposed on the fixing portion 110. Therefore, practically, the pen mouse 2 includes another electrical connector interface (not shown) with the same specifications on a corresponding location. Accordingly, signal transmission is built between the pen mouse 2 and the auxiliary device 1 when the pen mouse 2 and the auxiliary device 1 successfully combine. However, the present invention is not limited to the example of how the auxiliary device 1 receives the first cursor displacement information data from the pen mouse 2. Persons with ordinary skill in the art may make any modifications on the electrical connector interface 110a according to practical demands or applications. In addition, the locations of the fixing portion 110, the electrical connector interface 110a and processor 13 on auxiliary device 1 is not limited to the examples in FIG. 1. Persons with ordinary skill in the art make any modifications according to practical demands or applications.

Moreover, the processor 13 is coupled to the electrical connector interface 110a and is configured to determine whether to use the first cursor displacement information data provided by the pen mouse 2 and/or a second cursor displacement information data provided by the auxiliary device 1 as a control signal for controlling a cursor corresponding to an electronic device according to an operation mode selected by the user.

Figure 2A:
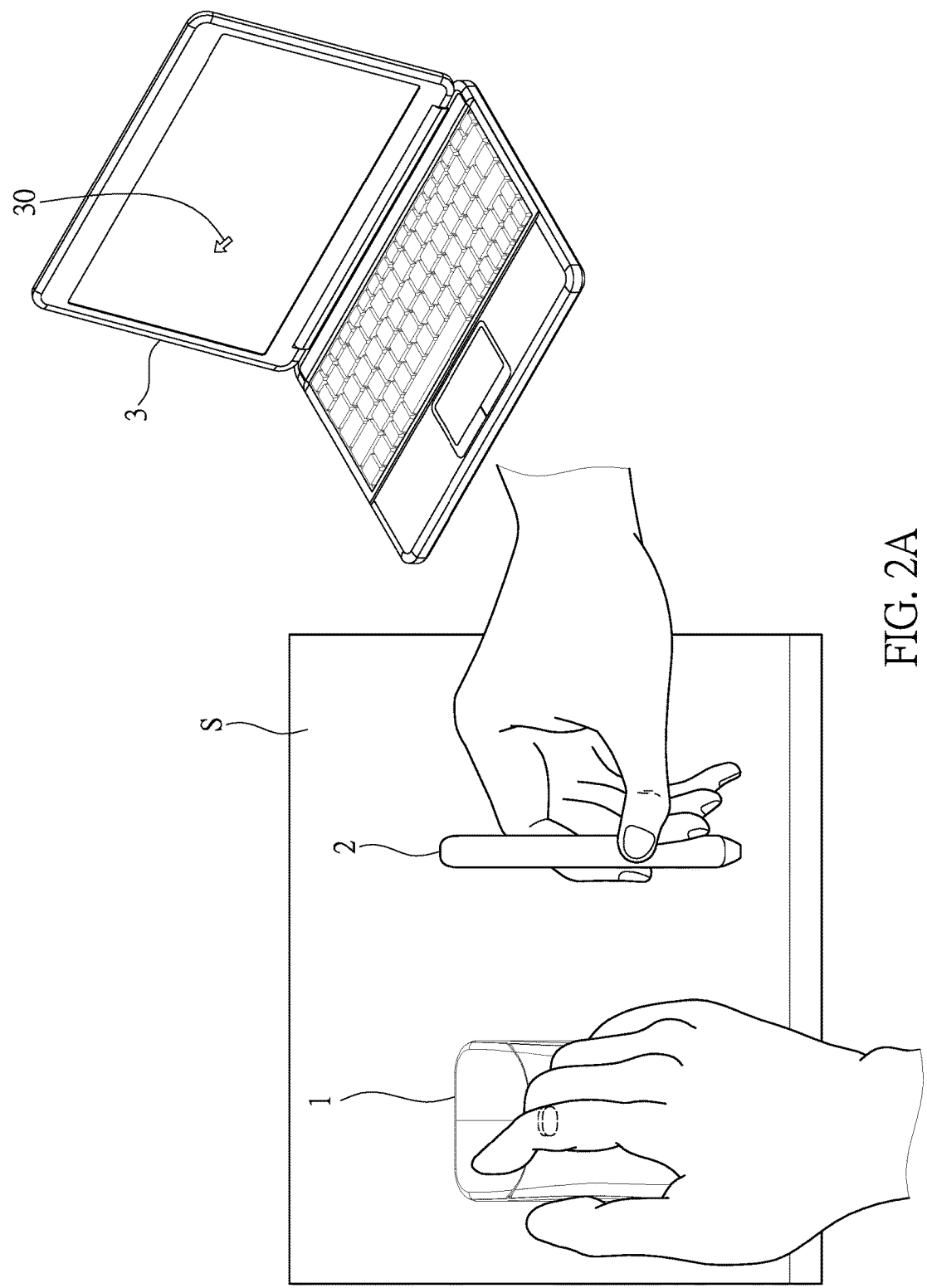
FIG. 2A is a schematic diagram showing the body of the auxiliary device in FIG. 1 not combined with the pen mouse.
Figure 2B:
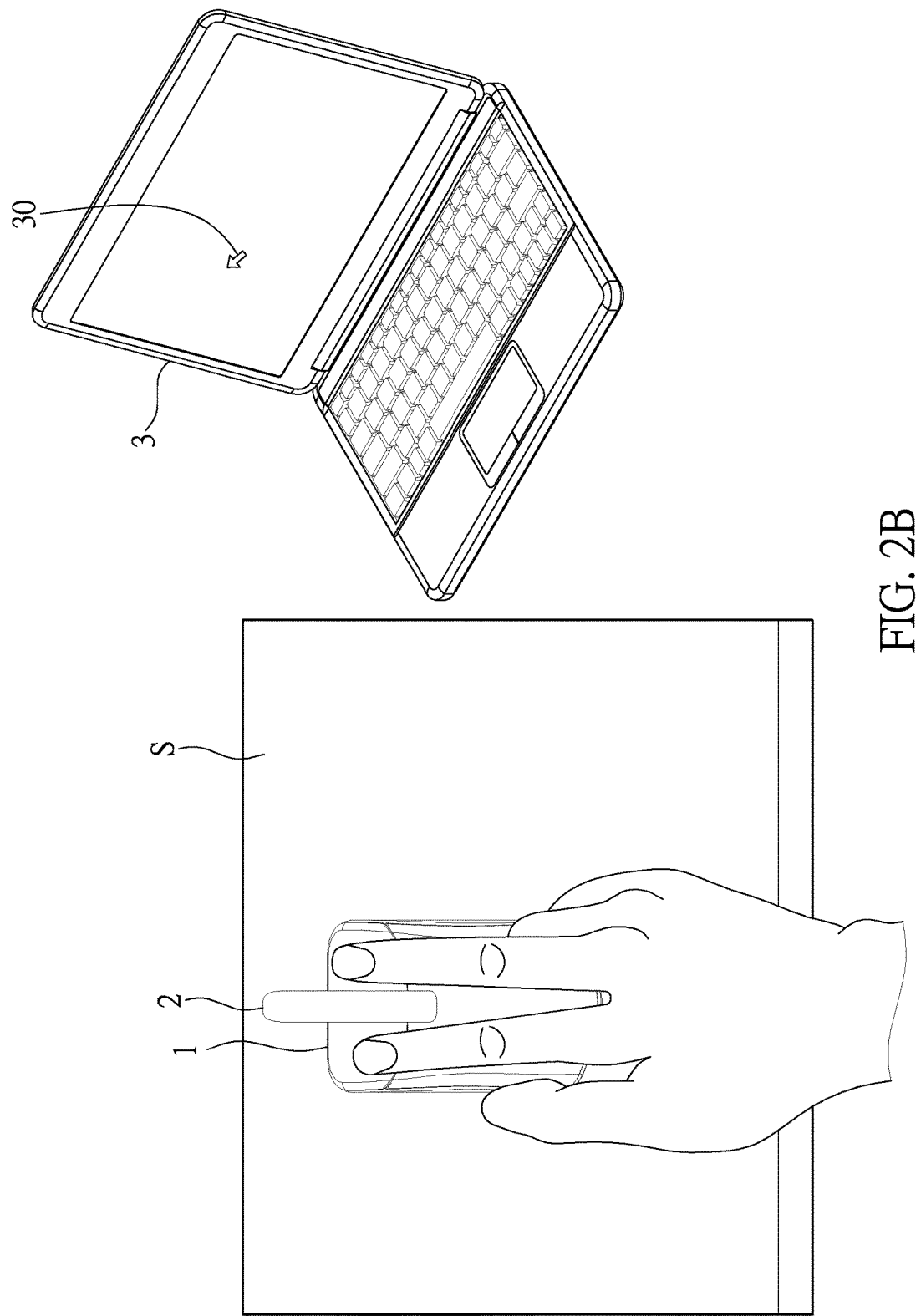
FIG. 2B is a schematic diagram showing the body of the auxiliary device in FIG. 1 combined with the pen mouse.

More particularly, please refer to FIG. 2A and FIG. 2B for better understanding the auxiliary device 1 of the present invention. FIG. 2A is a schematic diagram showing that the body of the auxiliary device in FIG. 1 not combined with the pen mouse, and FIG. 2B is a schematic diagram showing that the body of the auxiliary device in FIG. 1 combined with the pen mouse.

In FIG. 2A, when the pen mouse 2 is not combined with the auxiliary device 1, the user can directly use the displacement of the pen mouse 2 on the working plane S to control the movement of the cursor 30 on the electronic device 3. However, when the pen mouse 2 does not always point to the same direction and the pen mouse 2 may be rotated to cause a deviation of its angle with respect to the working plane S, the first cursor displacement information data of the pen mouse 2 may not match the movement of the cursor 30 on the electronic device 3. Therefore, in the present embodiment, the auxiliary device 1 provides a second cursor displacement information data as a control signal of the cursor 30 on the electronic device 3 according to an operation mode selected by the user.

Therefore, according to the teachings stated above, persons with ordinary skill in the art would understand that, the auxiliary device 1 is, for example, a conventional optical mouse or roller mouse that replaces the pen mouse 2 as a navigation device for controlling the cursor 30 on the electronic device 3, to which the present invention is not limited. In view of this, the auxiliary device 1 of the present embodiment further includes a sensor module 15. The sensor module 15 is coupled to the processor 13 and is configured to sense a displacement of the auxiliary device 1 on a working plane S so as to provide the second cursor displacement information data. The sensor module 15 is implemented by hardware circuitry, or by hardware circuitry with firmware or with software, to which the present invention is not limited. Moreover, since the auxiliary device 1 is, for example, a conventional optical mouse or roller mouse, the body 11 may be provided with a right key and a left key enabling the user to execute the associated programs by pressing the right key and the left key. In summary, the present invention is not limited to the previous implementation of the auxiliary device 1.

It should be noted that the present invention is not limited to the implementations of the operation mode selected by the user. In other embodiments, the user may manually select the operation mode by pressing a button (not shown) or a key (not shown) on the auxiliary device 1. Alternatively, when the sensor module 15 has sensed a displacement of the auxiliary device 1 on a working plane S, the processor 13 may automatically decide to use a second cursor displacement information data provided by the auxiliary device 1 as a control signal for controlling the cursor 30 corresponding to the electronic device 3. In summary, the above implementation only exemplifies the present embodiment and is not intended to limit the present invention. Persons with ordinary skill in the art may select the operation mode according to practical demands or applications.

On the other hand, in FIG. 2B, when the pen mouse 2 has been tightly combined with the auxiliary device 1, the user can selectively decide whether to use the first cursor displacement information data provided by the pen mouse 2 and/or a second cursor displacement information data provided by the auxiliary device 1 as a control signal for controlling the cursor 30 corresponding to the electronic device 3. For example, in the present embodiment, when the user selects the first cursor displacement information data provided by the pen mouse 2 as the control signal for controlling the cursor 30 corresponding to the electronic device 3, the pen mouse 2 is likely to point to the same direction because the navigation device held by the user is, for example, the auxiliary device 1 combined with the pen mouse 2. In other words, the rotation of the pen mouse 2 will not cause a deviation of its angle with respect to the working plane S such that the first cursor displacement information data provided by the pen mouse 2 conforms to the movement of the cursor 30 corresponding to the electronic device 3, as expected by the user.

Moreover, in the present embodiment, when the user selects the second cursor displacement information data provided by the auxiliary device 1 as the control signal for controlling the cursor 30 corresponding to the electronic device 3, the principle of how the second cursor displacement information data is provided, according to the movement of the auxiliary device 1 on the working plane S, is known to persons with ordinary skill in the art. Therefore, detailed description of the sensor module 15 is not presented herein. Moreover, when the user selects both the first cursor displacement information data and the second cursor displacement information data as the control signal for controlling the cursor 30 corresponding to the electronic device 3, the processor 13 is configured to provide the control signal for controlling the cursor 30 corresponding to the electronic device 3 based on the difference between the first cursor displacement information data and the second cursor displacement information data.

In summary, the above implementations only exemplify the present embodiment and are not intended to limit the present invention. Persons with ordinary skill in the art may make any modifications according to practical demands or applications. Accordingly, based on the teachings stated above, persons with ordinary skill in the art would understand that the auxiliary device 1 of the present embodiment, as compared to the conventional art, effectively improves the navigation precision of the pen mouse 2 and also simplifies the switching between the pen mouse 2 and the conventional mouse.

Moreover, as previously stated, the auxiliary device 1 can be, for example, a conventional optical mouse or roller mouse. The auxiliary device 1 may further include a transmission module 17 coupled to the processor 13, and the transmission module 17 is configured to transmit the control signal provided by the processor 13 to the electronic device 3 wiredly or wirelessly. The principle of how the control signal is transmitted to the electronic device 3 is known to persons with ordinary skill in the art. Therefore, detailed descriptions of the transmission module 17 are not presented herein. In summary, persons with ordinary skill in the art may design the transmission module 17 according to practical demands or applications.

On the other hand, since the currently available pen mouse 2 is powered by an internal battery (not shown), practically, the auxiliary device 1 may selectively include a charger module 19. The charger module 19 is coupled between the electrical connector interface 110a and the processor 13 and is configured to charge the pen mouse 2 through the electrical connector interface 110a to lengthen the duration of the pen mouse 2 when the pen mouse 2 is tightly combined with the auxiliary device 1.

Similarly, as previously stated, the auxiliary device 1 can be, for example, a conventional optical mouse. When the pen mouse 2 is tightly combined with the auxiliary device 1, the auxiliary device 1 and pen mouse 2 can share the light source 20. Alternatively, the auxiliary device 1 may selectively include at least one independent light source 10 different from the light source 20. The light source 20 and the independent light source 10 can both be, for example, a light-emitting diode (LED), to which the present invention is not limited. Therefore, according to the teachings stated above, persons with ordinary skill in the art would understand that, when the auxiliary device 1 includes the independent light source 10, the sensor module 15 of the auxiliary device 1 provides the second cursor displacement information data according to the movement of the independent light source 10 on the working plane S.

On the other hand, in the conventional art, the conventional navigation device usually includes only one light source sensor. Therefore, the light source sensor fails to sense the rotation of the navigation device on the working plane and provide a cursor control signal that includes rotation information data. On the contrary, according to the above teachings, the pen mouse 2 includes a light source sensor (not shown) disposed therein, and the auxiliary device 1 includes the sensor module 15 configured to provide the second cursor displacement information data according to the movement of the independent light source 10 on the working plane S. Therefore, when the pen mouse 2 is tightly combined with the auxiliary device 1, the processor 13 of the auxiliary device 1 provides a control signal including at least one rotation information data configured according to the angle variation between the first cursor displacement information data and the second cursor displacement information data. Accordingly, the auxiliary device 1 of the present embodiment, compared to the conventional art, provides higher-precision and better cursor control information.

Figure 3:
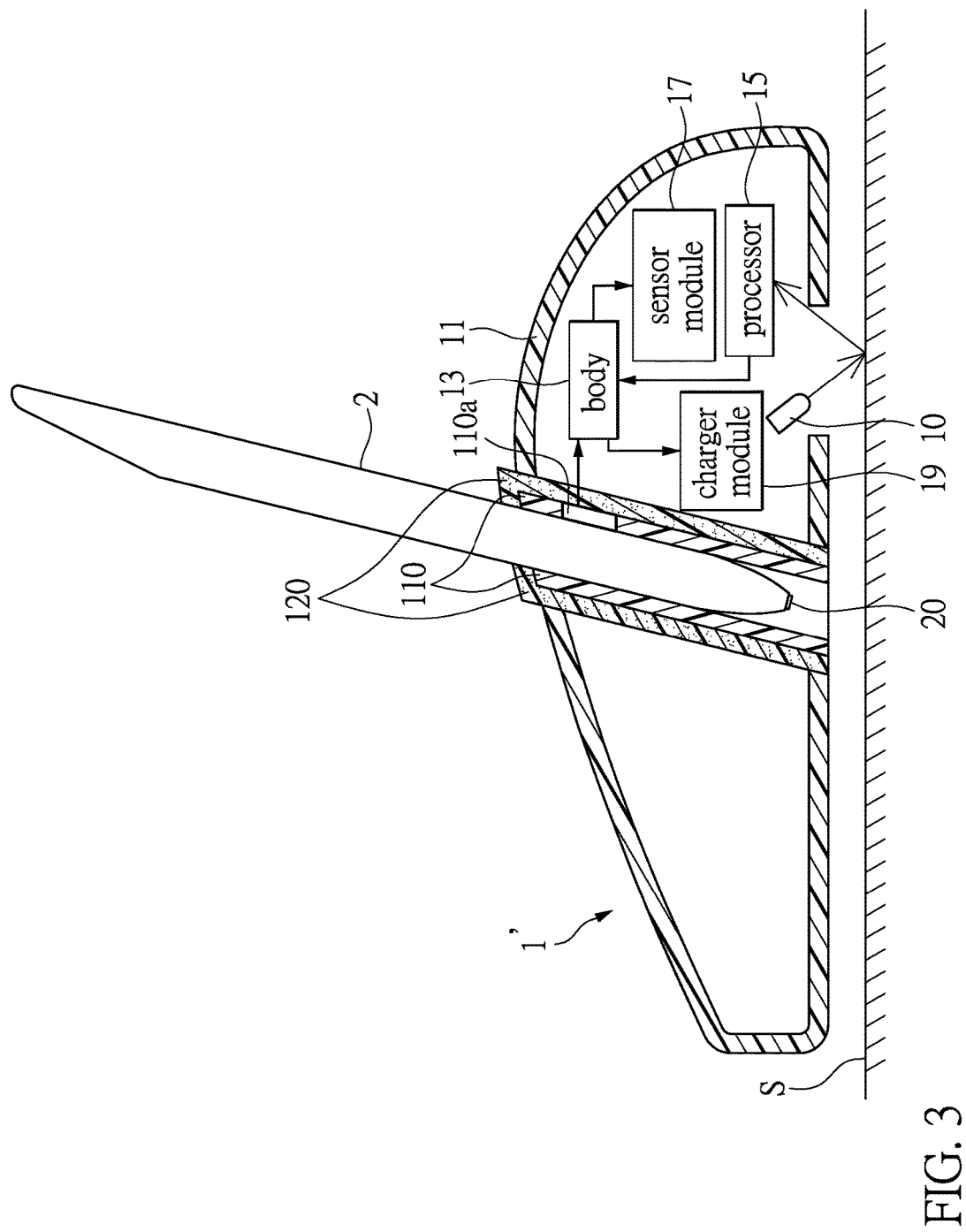
FIG. 3 is a functional block diagram of an auxiliary device according to another embodiment of the present invention.

Moreover, another application of the auxiliary device 1 will be presented herein. Referring to FIG. 3, FIG. 3 is a functional block diagram of an auxiliary device according to another embodiment of the present invention. Elements in FIG. 3 that are identical to those in FIG. 1 are labeled in the same way, and descriptions thereof are thus not repeated.

Furthermore, the auxiliary device 1' in FIG. 3, compared to FIG. 1, may further include a flexible cover 120. The flexible cover 120 covers the fixing portion 110 and is configured to enable the pen mouse 2 tightly combined with the auxiliary device 1' to wiggle in a non-directional 360-degree fashion on the body 110.

Figure 4:
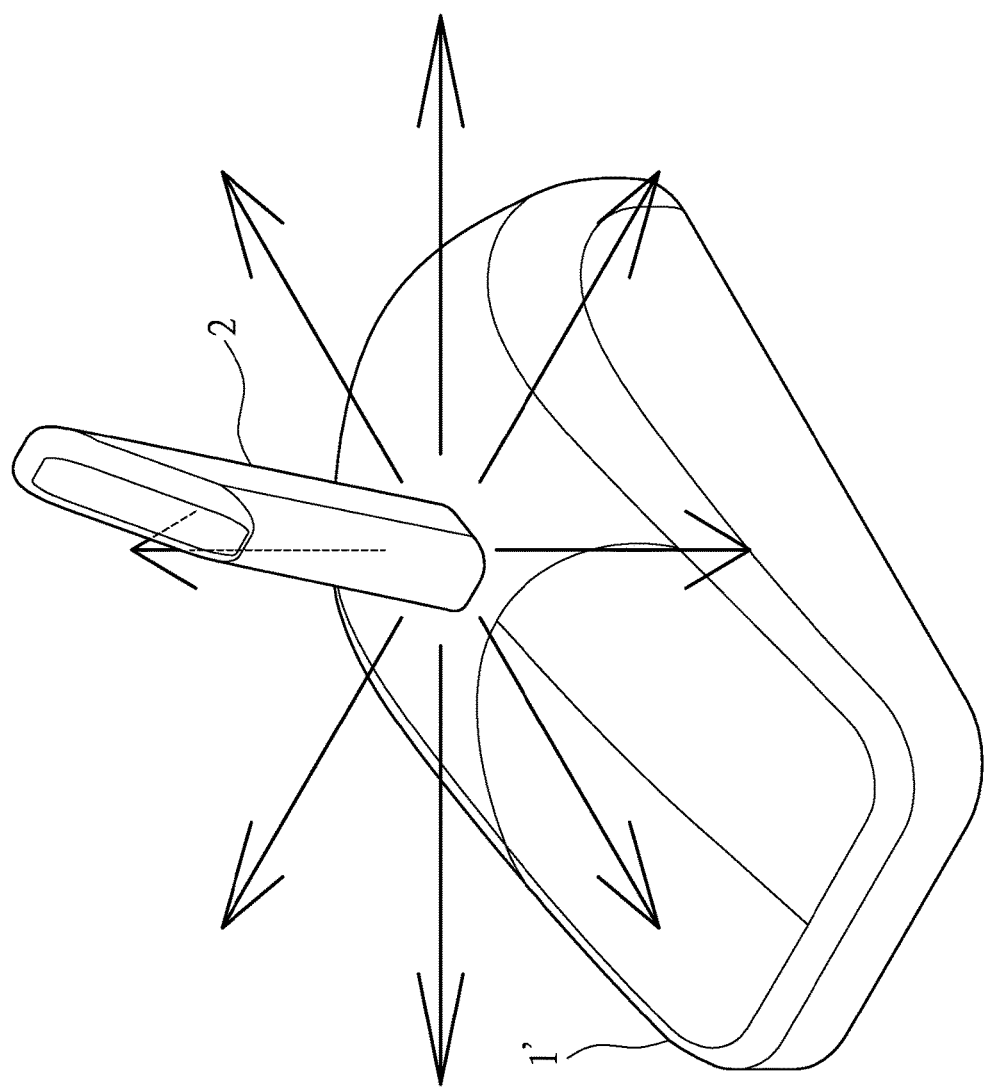
FIG. 4 is a schematic diagram showing the body of the auxiliary device in FIG. 3 combined with the pen mouse.

More particularly, referring to FIG. 4, FIG. 4 is provided to describe the application of the auxiliary device 1' in FIG. 3. In FIG. 4, the fixing portion 110 is completely covered by the flexible cover 120. Therefore, when the pen mouse 2 is tightly combined with the auxiliary device 1', the pen mouse 2 is capable of wiggling in a non-directional 360-degree fashion on the body 110. Practically, the pen mouse 2 combined with auxiliary device 1' is operable in the same way as a currently available joystick. Accordingly, compared to the conventional art, the auxiliary device 1' of the present embodiment provides more convenient and diverse operation experiences.

Figure 5:
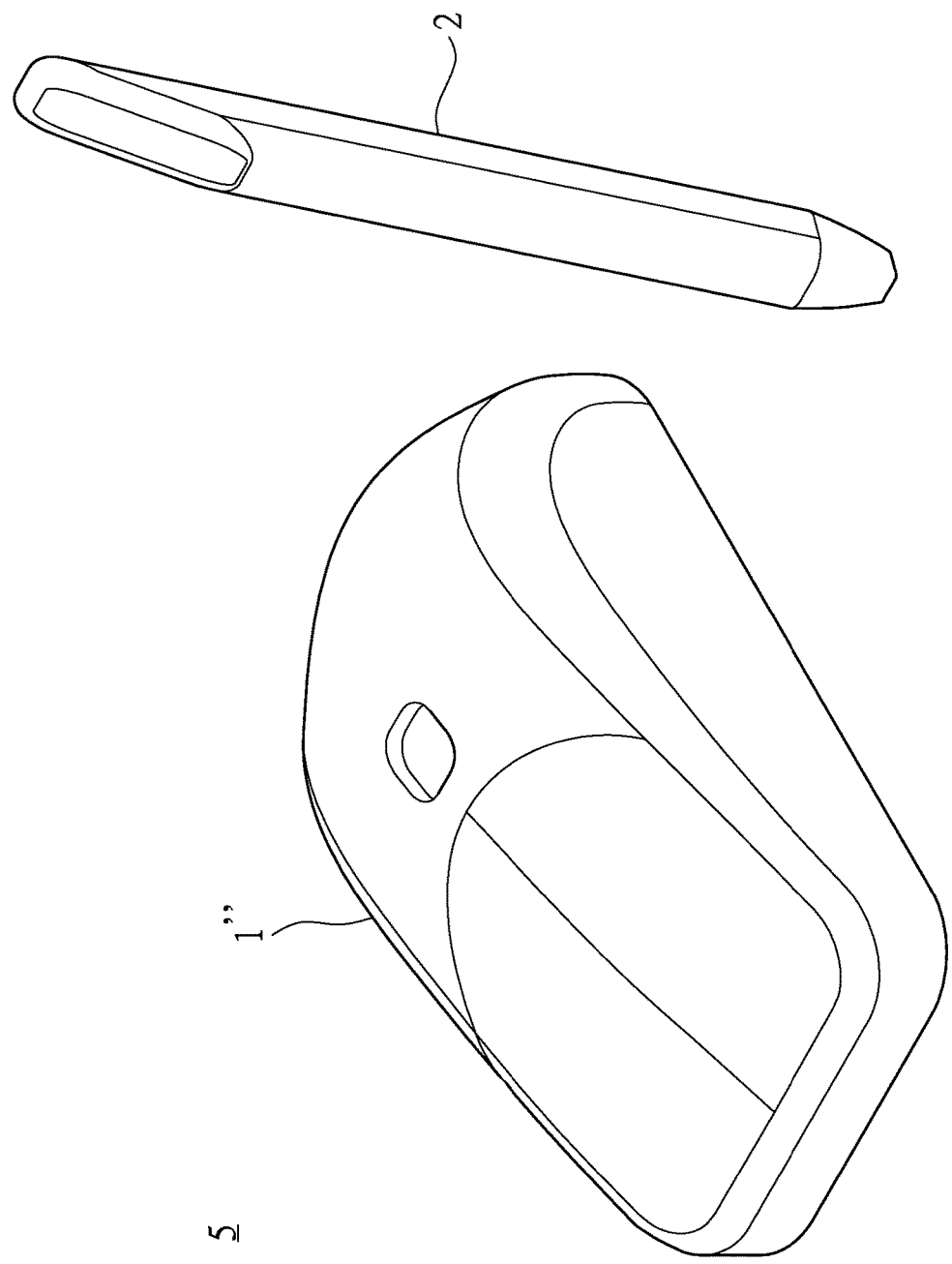
FIG. 5 is a schematic diagram of a navigation system according to one embodiment of the present invention.

Moreover, to further describe the operation of the auxiliary device, the present invention provides an implementation of the navigation system. Referring to FIG. 5, FIG. 5 is a schematic diagram of a navigation system according to one embodiment of the present invention. Elements in FIG. 5 that are identical to those in FIG. 1 to FIG. 4 are labeled in the same way, and descriptions thereof are thus not repeated.

Furthermore, a navigation system 5 includes a pen mouse 2 configured to provide a first cursor displacement information data and an auxiliary device 1" configured to provide a second cursor displacement information data. The auxiliary device 1" of the present embodiment is similar to the auxiliary device 1 or the auxiliary device 1'. Therefore, the auxiliary device 1" includes a body and a processor. The body includes a fixing portion configured to enable the user to selectively combine the pen mouse 2 tightly with the auxiliary device 1".

When the pen mouse 2 is tightly combined with the auxiliary device 1", the auxiliary device 1" receives the first cursor displacement information data provided by the pen mouse 2 through an electrical connector interface disposed on the fixing portion. The processor is configured to determine whether to use the first cursor displacement information data provided by the pen mouse 2 and/or a second cursor displacement information data provided by the auxiliary device 1" as a control signal for controlling a cursor corresponding to an electronic device according to an operation mode selected by the user.

Similarly, the auxiliary device 1" may selectively include at least one independent light source different from the light source of the pen mouse 2. Therefore, when the pen mouse 2 is tightly combined with the auxiliary device 1", the sensor module of the auxiliary device 1" provides the second cursor displacement information data according to the movement of the independent light source on the working plane. Moreover, the processor of the auxiliary device 1" provides a control signal including at least one rotation information data according to an angle variation between the first cursor displacement information data and the second cursor displacement information data.

On the other hand, the auxiliary device 1", similar to the auxiliary device 1', can include a flexible cover. The flexible cover covers the fixing portion, and is configured to enable the pen mouse 2 tightly combined with the auxiliary device 1" to wiggle in a non-directional 360-degree fashion on the body.

In summary, the auxiliary device and the navigation system according to the present invention are capable of providing precise cursor control information to bring forth more convenient and diverse operation experiences.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. An auxiliary device configured to integrate with a pen mouse, comprising:
    a body comprising a fixing portion enabling the user to selectively combine said pen mouse tightly with said auxiliary device, wherein said auxiliary device is configured to receive a first cursor displacement information data provided by said pen mouse through an electrical connector interface disposed on said fixing portion when said pen mouse is tightly combined with said auxiliary device; and
    a processor installed in the body of the auxiliary device and coupled to said electrical connector interface and configured to determine to use said first cursor displacement information data provided by said pen mouse and/or a second cursor displacement information data provided by said auxiliary device as a control signal for controlling a cursor corresponding to an electronic device according to an operation mode selected by the user;
    wherein a sensor module is installed in the body of said auxiliary device for sensing a displacement of said auxiliary device and the processor is configured to generate the second cursor displacement information data according to the displacement of said auxiliary device.

2. The auxiliary device of claim 1, further comprising:
    a sensor module coupled to said processor and configured to sense the displacement of said auxiliary device on the working plane so as to provide said second cursor displacement information data.

3. The auxiliary device of claim 1, further comprising:
    a transmission module coupled to said processor and configured to transmit said control signal to said electronic device though a wired connection or a wireless connection.

4. The auxiliary device of claim 1, further comprising:
    a charger module coupled between said electrical connector interface and said processor and configured to charge said pen mouse through said electrical connector interface when said pen mouse is tightly combined with said auxiliary device.

5. The auxiliary device of claim 2, wherein said auxiliary device is an optical mouse or a roller mouse, and said pen mouse is an optical pen mouse comprising at least one light source, wherein said auxiliary device and said pen mouse share said light source or said auxiliary device further comprises at least one independent light source when said auxiliary device is said optical mouse.

6. The auxiliary device of claim 5, wherein said light source is a light emitting diode (LED).

7. The auxiliary device of claim 6, wherein said sensor module in said auxiliary device is configured to provide said second cursor displacement information data according to a displacement of said independent light source on said working plane when said auxiliary device further comprises said independent light source, and said processor is configured to provide said control signal comprising at least one rotation information data according to an angle variation between said first cursor displacement information data and said second cursor displacement information data when said pen mouse is tightly combined with said auxiliary device.

8. The auxiliary device of claim 1, wherein said body further comprises a flexible cover covering said fixing portion and configured to enable said pen mouse tightly combined with said auxiliary device to wiggle in a non-directional 360-degree fashion on said body.

9. A navigation system, comprising:
    a pen mouse configured to provide a first cursor displacement information data; and
    an auxiliary device configured to provide a second cursor displacement information data, said auxiliary device comprising:
    a body comprising a fixing portion enabling the user to selectively combine said pen mouse tightly with said auxiliary device, wherein said auxiliary device is configured to receive said first cursor displacement information data provided by said pen mouse through an electrical connector interface disposed on said fixing portion when said pen mouse is tightly combined with said auxiliary device; and
    a processor installed in the body of the auxiliary device and coupled to said electrical connector interface and configured to determine to use said first cursor displacement information data provided by said pen mouse and/or said second cursor displacement information data provided by said auxiliary device as a control signal for controlling a cursor corresponding to an electronic device according to an operation mode selected by the user;
    wherein a sensor module is installed in the body of said auxiliary device for sensing a displacement of said auxiliary device and the processor is configured to generate the second cursor displacement information data according to the displacement of said auxiliary device.

10. The navigation system of claim 9, wherein said auxiliary device further comprises:
    a sensor module coupled to said processor and configured to sense the displacement of said auxiliary device on the working plane so as to provide said second cursor displacement information data.

11. The navigation system of claim 10, wherein said auxiliary device is an optical mouse or a roller mouse, and said pen mouse is an optical pen mouse comprising at least one light source, wherein said auxiliary device and said pen mouse share said light source or said auxiliary device further comprises at least one independent light source when said auxiliary device is said optical mouse.

12. The navigation system of claim 11, wherein said light source is a light emitting diode (LED).

13. The navigation system of claim 12, wherein said sensor module in said auxiliary device is configured to provide said second cursor displacement information data according to a displacement of said independent light source on said working plane when said auxiliary device further comprises said independent light source, and said processor is configured to provide said control signal comprising at least one rotation information data according to an angle variation between said first cursor displacement information data and said second cursor displacement information data when said pen mouse is tightly combined with said auxiliary device.

14. The navigation system of claim 9, wherein said auxiliary device further comprises:

a transmission module coupled to said processor and configured to transmit said control signal to said electronic device though a wired connection or a wireless connection.

15. The navigation system of claim 9, wherein said auxiliary device further comprises:

a charger module coupled between said electrical connector interface and said processor and configured to charge said pen mouse through said electrical connector interface when said pen mouse is tightly combined with said auxiliary device.

16. The navigation system of claim 9, wherein said body further comprises a flexible cover covering said fixing portion and configured to enable said pen mouse tightly combined with said auxiliary device to wiggle in a non-directional 360-degree fashion on said body.

* * * * *